Figure 1:
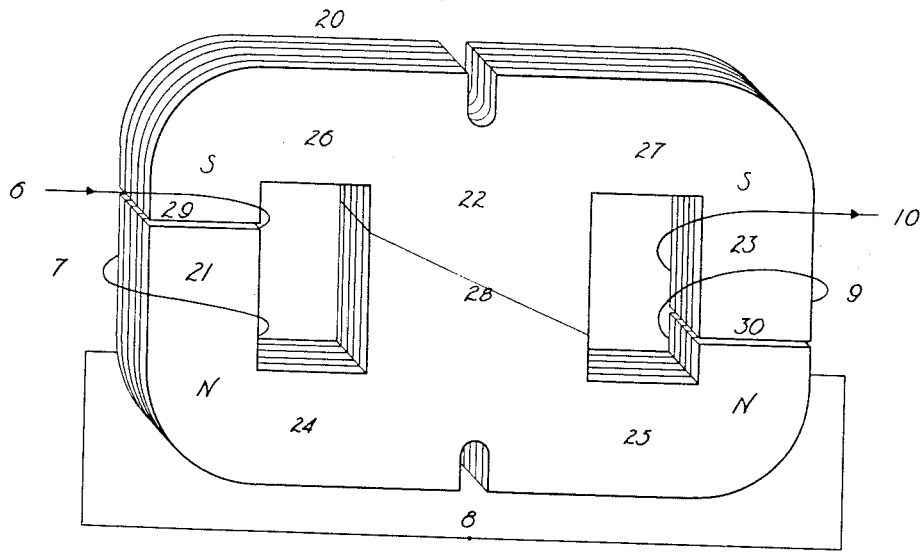

Feb. 14, 1933.  W. K. FLEMING  1,897,249

ELECTRICAL SYSTEM

Filed Dec. 21, 1927

INVENTOR.
WILFRED K. FLEMING
BY
ATTORNEY.

Patented Feb. 14, 1933

1,897,249

UNITED STATES PATENT OFFICE

WILFRED K. FLEMING, OF CAMBRIDGE, MASSACHUSETTS, ASSIGNOR TO RAYTHEON INC., OF CAMBRIDGE, MASSACHUSETTS, A CORPORATION OF MASSACHUSETTS

ELECTRICAL SYSTEM

Application filed December 21, 1927. Serial No. 241,553.

My invention relates to electrical smoothing devices and to systems for obtaining a substantially constant direct current of electricity from a source of alternating or pulsating direct current. I do this while keeping the energy in its electrical form throughout the entire process and do not make any energy transformations in the process of smoothing.

Recent developments in electrical arts have made it very desirable that alternating currents of electricity at predetermined voltages be transformed into substantially constant direct currents at any one or more desired voltages. This is especially true in radio devices where the well known vacuum tubes are used. Such tubes, as a rule, preferably require a direct current of substantially unvarying potential to heat their filaments, energize the plate circuits and bias the grid circuits. In radio receiving and transmitting sets, it is very desirable and convenient to obtain all the energy for operating the tubes from the lighting circuits. Such lighting circuits may supply either direct current or alternating current. In the first case, the direct current obtained from the mains usually has very objectionable commutator ripples and can not be used directly. In the case of alternating current, which is the more common case, a transformer usually changes the line voltage to any voltages desired. The currents are then led into a rectifying device. The current as given out then is a pulsating direct current which must be smoothed out before it can be used.

The pulsating currents obtained either from direct current mains or from rectified alternating current is ordinarily smoothed out by means of inductance and capacity. As is well known, if the currents are conducted to a device having considerable inductance, the choking action tends to smooth the current out. In connection with such a device, it is customary to connect a device having capacity across the line so that the ripples of current may be shunted across the line and thus both the inductance and capacity tend to smooth out any irregularities in the current.

The action of an inductance under such conditions is well-known and understood. The current traverses coils and forms magnetic fields. Material of high permeability as a rule are used in connection with the coils so that intense magnetic fields are created. To operate a smoothing device of this character efficiently, it is obvious that the intensity of the fields created within the material should be such that any variation of the energizing current results in a great variation of the intensity of the magnetic field within the material. As is well known, with materials of great magnetic permeability, at very low and high magnetic field intensities, a variation of energizing current does not produce a great variation in the resultant magnetic field intensity. It is only in the intermediate intensities that the desired result may be obtained.

The problem of bulk, weight, and cost of smoothing systems for supplying the plate circuit of tubes is not as great as for systems for supplying the filament circuit of the tubes since the filament circuit requires greater currents than the plate circuit, although the problem of reducing bulk, weight and cost is present in both types of systems. When the current to be smoothed out becomes greater, the wire to carry the current in the choke coils must be heavier and this makes for more bulk and weight and also cost. A greater current represents more ampere turns for a certain number of turns of wire and hence more magnetizable material must be used if the intensity of the magnetic field is to be kept within desirable limits.

To reduce the bulk of the magnetizable material, some have attempted to increase the reluctance of the entire magnetic circuits by providing a section of small length which has very low permeability, usually an air gap of small dimensions in the magnetic circuit. In this way, sufficient reluctance is introduced into the entire magnetic circuit so that with the ampere turns used, the magnetizable material is operated at medium magnetic intensities. Even with such means, a choke would still be very bulky and would cost very much if it has to handle all the current necessary to energize the filament or plate circuits.

One object of my invention is to design a choke that will handle comparatively heavy currents without at the same time requiring considerable wire and magnetizable material.

Another object is to design a smoothing system that will handle comparatively heavy currents without requiring condensers of large capacity.

A further object is to design a smoothing system that will handle comparatively heavy currents with a minimum wire, magnetizable material, and condensers.

Another object is to so design a current smoothing system that it will operate at a greater efficiency with a minimum of material.

The pulsating direct current coming to the smoothing system may be considered as made up of a steady unvarying direct current and an alternating current superimposed thereon. It is obvious that the most efficient manner of smoothing out such a current is to operate only, or mainly, on the alternating current component and to reduce or eliminate or neutralize the magnetic effects of the direct current. I attain this object in general by conducting the pulsating current through a plurality of coils, electrically connected to each other, said coils being provided with cores magnetically connected so that a plurality of complete magnetic circuits are created within the cores, which are of some highly magnetizable material, like iron for example, or transformer steel, or in fact any metal or alloy that has a high permeability. The magnetic circuits, though complete in themselves, have a common path. The fields in the magnetic circuits are in such directions that they are in opposition at their meeting places. The common path traversed by the lines of force is traversed in the same direction. Condensers are connected at each end of the current carrying coils. In general this system has its magnetic and electrical elements so interrelated that the fields due to the steady direct current components so affect each other that the remaining alternating current components are more effectively reduced.

Figure 2:
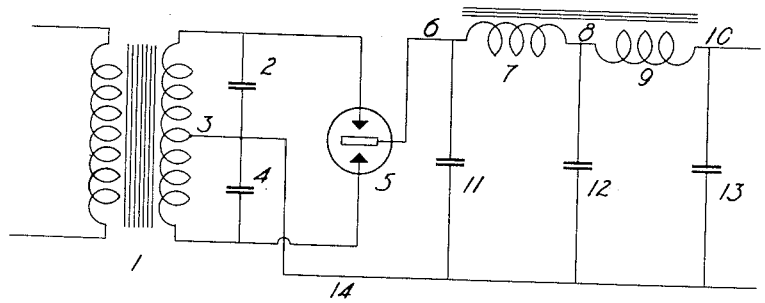

Referring to the drawing, Figure 1 is a diagrammatic showing of my inductance or choke element while Figure 2 shows my choke or inductance connected with condensers in a rectifying circuit.

Referring to Figure 1, my choke is generally designated by reference numeral 20. As shown, the choke is preferably laminated, though not necessarily so. The laminations as shown are in two sections. The top section comprises cores or portions 26 and 27 with part of the vertical cores or portions 21, 22 and 23. The bottom section comprises cores or portions 24 and 25 with the remaining parts of cores or portions 21, 22 and 23. The two sections meet at the junction 28 as shown. At 29 and 30, air gaps are shown between the sections. These gaps may be as large as may be found desirable or may be omitted either on one side or both. A current carrying coil 7 is shown on core or portion 21, while a similar current carrying coil 9 is shown on core or portion 23. It is perfectly obvious that coils 7 and 9 may be subdivided into two or more coils and such coils may be wound around the adjacent cores or portions. The two coils need not necessarily be equal but are preferably made so. The coils are connected together at 8 as shown in such a way that the fields formed by these coils are similar and tend to oppose each other at their meeting places. As shown, the coils may be so wound that if the current of electricity be considered as coming in at 6 and leaving at 10, then south poles will be formed at the top and north poles will be formed at the bottom. The core or portion 22 is preferably of approximately double the cross-section of the remaining cores or portions, which are usually substantially uniform, though not necessarily.

Referring to Figure 2, 1 is an ordinary and well known transformer to change the line voltage to any desired voltage. The secondary has a center tap 3, as shown, which constitutes one side of the direct current line at 14. The end connections are led to a rectifying device 5 of any type, here shown as of the full-wave type. The center electrode of the rectifier is shown as connected to the other side of the direct current line. Condensers 2 and 4 are shown as connected across each portion of the secondary winding of transformer 1. Wire 6 leads to coil 7, through connection 8 to coil 9 and then out to 10, one side of the smooth direct current line. Wire 14 as shown has three condensers connected across to the other side. Condensers 11, 12 and 13 are connected, as shown, to the coil ends 7, 8 and 9. Before the current comes to the choke, it is direct but pulsating. After going through it, it is substantially smooth and direct. Of course, instead of an alternating current circuit with a transformer and rectifier, the choke may be used on direct current mains directly for eliminating undesirable commutator ripples. Rectifier 5 may be any kind of a device with any number of electrodes and which may supply any kind of pulsating currents.

To properly function, it is necessary that condensers 11 and 12 have certain values. These values depend on the relative sizes of coils 7 and 9 and also on the value of one of the two condensers. Thus, if a certain capacity is put at 11, then 12 must be a certain capacity to have the choke act properly. It is immaterial which condenser (11 or 12) is chosen first. The other one will be determined by simple experimentation. Thus to take a concrete example, in a 300 m. a. choke, when 11 was chosen as 4 microfarads, 12 came out approximately ½ a microfarad. The capacity of 13 was chosen as 6 although this condenser is practically independent of the other two. Had the same choke been connected, so that the coils 7 and 9 aided each other, as is common, then 11, 12 and 13 would have had to be 4, 4 and 8 microfarads respectively, to obtain similar filter action, which is much more capacity than used in my system. It has been my observation that if the value of 11 is raised, the value necessary for 12 appears to go up also. The necessary values for the condensers are not highly critical at all. Thus for the values take above, the condenser 12 could have been ⅜ or ⅝ of a microfarad and worked just as well.

Less wire is needed in a choke as connected above for the same filtering action, 10% having been the reduction in the case above. Furthermore, less iron or other magnetizable material is necessary. Taking the entire wire, iron and capacity reduction as a whole, a filter unit for the same filtering effect, comprising the choke and three condensers has about 20% less material and therefore costs less. This also includes the reduction in capacity necessary since the choke and condensers, as shown, uniformly require less capacity to filter out irregularities than does an ordinary type of choke.

It will thus be obvious that I have designed a filter or smoothing system for eliminating undesirable irregularities in a pulsating direct current which is less bulky, lighter, requires less material, does not need such high capacity condensers, is very simple and less expensive than any of the systems known at present time to me.

In accordance with the patent statutes, I have disclosed my invention and therefore claim:

A device for obtaining a substantially constant current from a source of variable direct current, including an inductance adapted to be connected in series with said source, said inductance comprising a plurality of coils, magnetic material forming a magnetic circuit for each of said coils, said material being so arranged that said magnetic circuits have one section in common, said coils being so arranged that the fluxes tend to oppose each other at their meeting place and pass through said common section in the same direction, and a capacity having one side thereof connected between said coils, the other side of said capacity being adapted to be connected to the opposite terminal of said source.

In testimony whereof, I have signed my name to this specification.

WILFRED K. FLEMING.